United States Patent [19]

Masui et al.

[11] Patent Number: 4,878,134

[45] Date of Patent: Oct. 31, 1989

[54] INFORMATION SIGNAL RECORDING APPARATUS FOR ALIGNING HELICAL SLANT TRACKS

[75] Inventors: Toshiyuki Masui, Kanagawa; Motokazu Kashida, Tokyo; Koji Takahashi; Kenichi Nagasawa, both of Kanagawa, all of Japan

[73] Assignee: Canon Kabushiki Kaisha, Tokyo, Japan

[21] Appl. No.: 855,174

[22] Filed: Apr. 22, 1986

[30] Foreign Application Priority Data

Apr. 25, 1985 [JP] Japan .................................. 60-090311

[51] Int. Cl.[4] ...................... G11B 5/584; G11B 15/467
[52] U.S. Cl. .................................. 360/77.15; 360/13; 360/18; 360/22; 360/32; 360/73.09; 360/77.14
[58] Field of Search ....................... 360/13, 14.1, 8, 22, 360/23, 18, 19.1, 20, 10.1–10.3, 27, 32, 9.1, 73, 75, 77, 70, 73.09, 73.11, 73.12, 77.13, 77.14, 77.15, 73.04

[56] References Cited

U.S. PATENT DOCUMENTS

4,558,378 12/1985 Shibata et al. ...................... 360/19.1
4,573,089 2/1986 Maeda et al. .......................... 360/77
4,602,298 7/1986 Nishitani et al. .................... 360/14.1

Primary Examiner—Alan Faber
Assistant Examiner—Steven R. Garland
Attorney, Agent, or Firm—Robin, Blecker, Daley & Driscoll

[57] ABSTRACT

An apparatus for recording an information signal with rotary heads in each of a plurality of areas extending in the longitudinal direction of a tape-shaped recording medium is arranged to reproduce with the rotary heads a signal already recorded in a first area among the plurality of areas; and to record the information signal in the second of the areas while performing tracking control over the rotary heads by using the reproduced signal obtained from the first area.

14 Claims, 6 Drawing Sheets

INFORMATION SIGNAL RECORDING APPARATUS FOR ALIGNING HELICAL SLANT TRACKS

BACKGROUND OF THE INVENTION

1. Field of the Invention

This invention relates to an information signal recording apparatus and more particularly to an apparatus arranged to record with rotary heads an information signal in each of a plurality of areas extending in the longitudinal direction of a tape-shaped recording medium.

2. Description of the Prior Art

Tape recorders recently proposed include a kind arranged to have a magnetic tape wrapped to a given degree of angle about a rotary cylinder which is provided with rotary heads and to record or reproduce digital audio signals by means of the heads individually in or from each of plurality of recording areas longitudinally extending on the magnetic tape.

Figure 1:
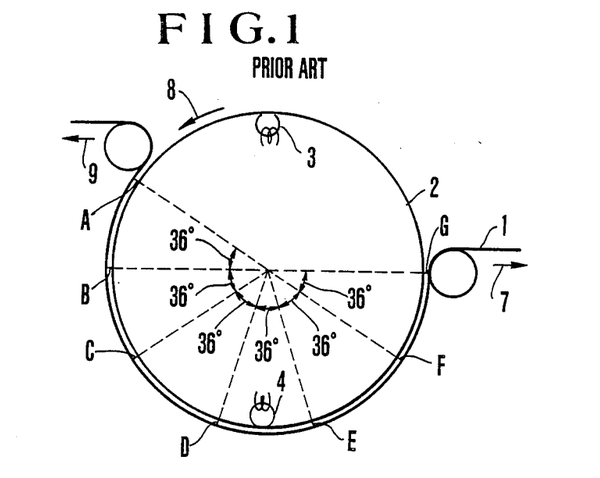
FIG. 1 is a schematic illustration of the tape transport system of the conventional digital audio tape recorder.
Figure 2:
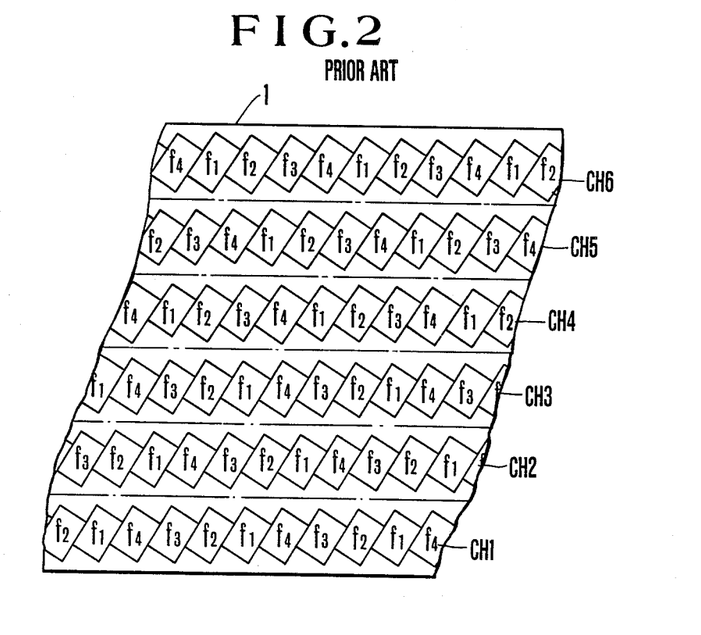
FIG. 2 is an illustration of recording tracks formed on a tape by the same tape recorder having the tape transport system of FIG. 1.

FIG. 1 of the accompanying drawings shows the tape transport system of the above-stated multi-track digital audio tape recorder of the prior art. FIG. 2 shows the recording tracks formed on a tape by this tape recorder. In FIG. 2, recording areas CH1 to CH6 are arranged to individually have audio signal recorded therein while a head 3 or 4 traces the tape from a point A to a point B, from the point B to a point C, from the point C to a point D, from the point D to a point E, from the point E to a point F and from the point F to a point G respectively as shown in FIG. 1. In each of these areas, the so-called azimuth overlapped writing is performed. However, the recording tracks in each of these areas do not have to be on the same straight line. Further, pilot signals of different frequencies f1, f2, f3 and f4 are recorded for the purpose of tracking control in each of the areas in rotation in the fixed order of f1 - f2 - f3 - f4. However, the pilot signals in each of these areas are not correlated with those of other areas.

Again referring to FIG. 1, in case that signals are arranged to be recorded or reproduced in or from the areas CH1 to CH3 when the tape is allowed to travel at a given speed in the direction of arrow 7 and to be recorded or reproduced in or from other areas CH4 to CH6 when the tape travels in the direction of arrow 9, the inclination of the tracks formed in the areas CH1 to CH3 somewhat differs from that of tracks formed in other areas CH4 to CH6 as shown in FIG. 2. However, the difference between the two directions in the relative speed of the tape and the head presents no problem as the travelling speed of the tape 1 is extremely low compared with the revolving speed of the heads 3 and 4.

Figure 3:
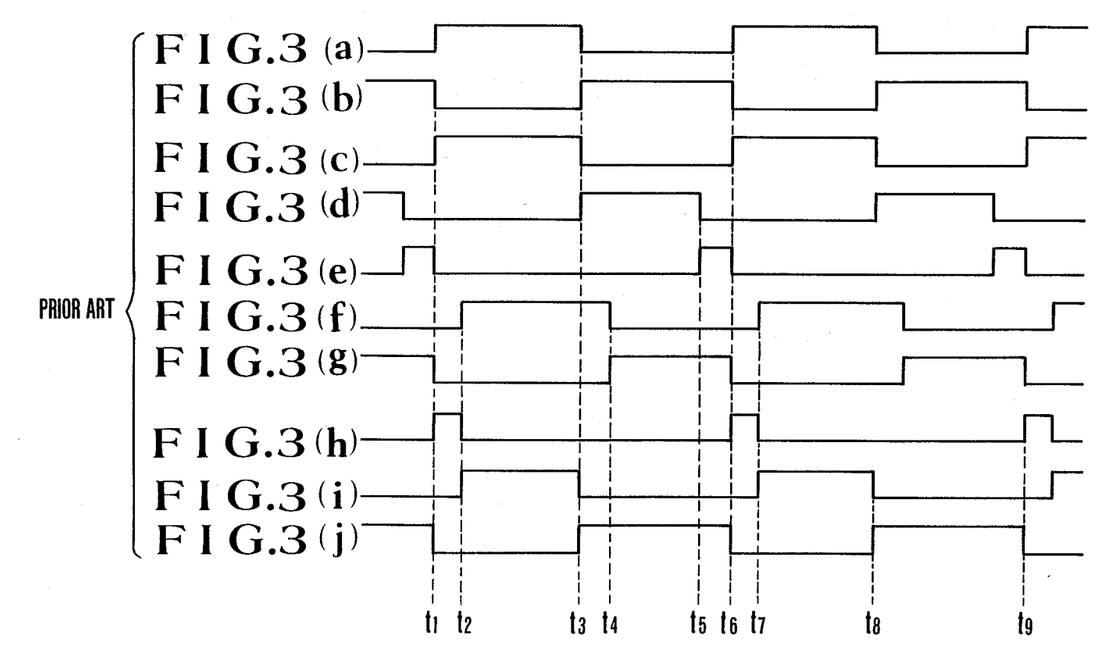

FIGS. 3(a) to 3(j) show in a time chart the recording and reproducing operations of the tape recorder which is arranged as described above. FIG. 3(a) shows a phase detection pulse signal (hereinafter referred to as a signal PGa)) which is produced in synchronism with the rotation of the cylinder 2 in a rectangular wave form of 30 Hz alternating a high level and a low level (hereinafter referred to as H and L levels respectively) in a cycle of 1/60 sec. FIG. 3(b) shows a pulse signal PG(b) which is of the polarity opposite to that of the signal PG(a). The signal PG(a) remains at an H level while the head 3 is revolving from the point B to the point G of FIG. 1. The signal PG(b) stays at an H level while the head 4 is revolving also from the point B to the point G.

FIG. 3(c) shows a data reading pulse signal (c) obtained from the signal PG(a). The signal (c) is used for sampling, for every other field, an audio signal produced during a period corresponding to one field (1/60 sec.) portion of a video signal. FIG. 3(d) shows a signal (d) which is produced at an H level representing a signal processing period for adding an error correcting redundant code or the like to the sampled one field portion of the audio signal or data by means of a RAM or the like or for changing the arrangement of the data. FIG. 3(e) shows a signal (e) which is produced at an H level to indicate a data recording period and to show a timing for recording on the tape the data obtained through the above-stated signal processing operation.

Referring to FIGS. 3(a) to 3(j), the temporal flow of signals is as follows: The data sampled during a period between points of time t1 and t3 (during which the position of the head 3 shifts from the point B to the point G) is subjected to the signal processing operation during a period between points of time t3 and t5 (during which the position of the head 3 shifts from the point G to the point A) and is recorded during a period between points of time t5 and t6 (during which the position of the head 3 shifts from the point A to the point B). More specifically, the sampled data is recorded into the area CH1 of FIG. 2 by means of the head 3. Meanwhile, the data which is sampled while the signal PG(b) is at an H level is also subjected to the signal processing operation at a similar timing and is recorded into the area CH1 by the other head 4.

FIG. 3(f) shows a signal PG(f) which is obtained by phase shifting the signal PG(a) to a predetermined extent (or 36 degrees corresponding to one area). In case that an audio signal is to be recorded by using this signal PG(f) and another signal which is of the polarity opposite to that of the signal PG(f), the recorder operates as follows: The data sampled during a period between the points of time t2 and t4 is signal processed according to a signal (g) shown at FIG. 3(g) and is recorded during a period between points of time t6 and t7 according to a signal (h) shown at FIG. 3(h). In other words, the data is recorded in the area CH2 shown in FIG. 2 by the head 3 while the head 3 is tracing the tape from a point B to another point C. The data which is sampled during a period between the points of time t4 and t7 is likewise recorded in the area CH2 by the head 4.

During the period between the points of time t6 and t7 (or between t1 and t2), the signal recorded in the area CH2 is reproduced in the following manner: The head 3 reads data from the tape 1 according to the signal (h) of FIG. 3(h). The data which is thus read is signal processed according to a signal (i) shown at FIG. 3(i) during a period between points of time t7 and t8 (or between t2 and t3) in a manner reverse to the signal processing operation performed during recording. In other words, error correction, etc. are accomplished during this period. A reproduced audio signal which is thus obtained is produced according to a signal (j) shown at FIG. 3(j) during a period between points of time t8 and t9 (or between t3 and t6). Meanwhile, the other head 4 likewise performs a reproducing operation at a phase difference of 180 degrees from the above-stated reproducing operation of the head 3 to give a continuous reproduced audio signal in conjunction with the head 3. For each of other areas CH3 to CH6, the signal PG(a) is phase shifted to a degree of n×36° and recording and reproduction are performed according to the phase shifted signal PG(a) in the same manner as the operations mentioned above. These operations can be accomplished irrespective of the travelling direction of the tape.

While the tape recorder of the above-stated kind permits individual use of each area, it has been difficult to simultaneously use the plurality of areas. In other words, since each area is individually used for recording, it is impossible to obtain adequately reproduced signals, RF simultaneously from two of these areas by using one and the same rotary head. In the event of recording which is not performed by so-called azimuth recording, reproduced signals obtained from two tracks partially mix with each other to prevent adequate reproduction. In the case of so-called azimuth overlapped recording, there arises some region, that, gives almost no reproduced signal RF.

Figure 4:
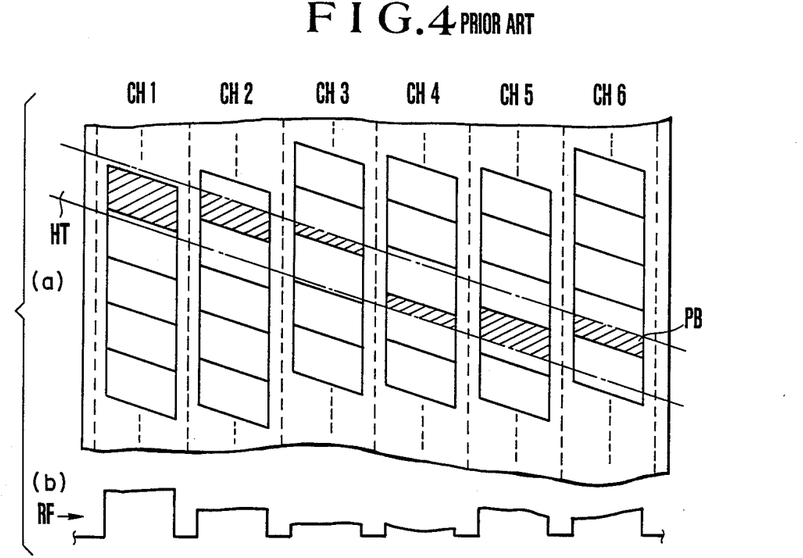

Part (a) of FIG. 4 shows the tracing locus of the rotary head obtained during reproduction performed by the conventional tape recorder. In part (a) of FIG. 4, a reference symbol HT denotes the tracing locus of the head. Hatched parts PB indicate parts where the, reproduced signal RF is obtainable. In the case of part (a) of FIG. 4, tracking is allowed to be adequately carried out for the area CH1. Part (b) of FIG. 4 denotes a reproduced signal. As shown, almost no signal is reproduced from the areas CH3 and CH4. This brings about the following problems: In detecting whether or not an audio signal has already been recorded in each of these areas, the area from which no reproduced RF signal is obtained might be mistaken for a non-recorded area. Further, in case that an audio signal (such as a signal BGM) which is related to an audio signal recorded in a first area is recorded in a second area, it is difficult to simultaneously reproduce these signals. In other words, it has been impossible to impart the so-called sound-on-sound function to the tape recorder.

SUMMARY OF THE INVENTION

In view of the problems of the prior art mentioned in the foregoing, it is an object of this invention to provide an information signal recording apparatus which is capable of permitting the simultaneous use of a plurality of areas extending in the longitudinal direction of a tape-shaped recording medium.

It is another object of this invention to provide an information signal recording apparatus which is capable of recording signals on a tape-shaped recording medium in a plurality of recording areas extending in the longitudinal direction of the medium in such a manner that the signals recorded in the plurality of areas can be simultaneously reproduced with one and the same rotary head.

Under this object, an information signal recording apparatus arranged as an embodiment of this invention to record an information signal in each of a plurality of recording areas extending in the longitudinal direction of a tape-shaped recording medium comprises: a rotary head arranged to be capable of recording the information signal in any of the plurality of recording areas; moving means for longitudinally moving the tape-shaped recording medium; and control means for controlling the moving means by using a signal reproduced by the rotary head from a second area among the plurality of areas while the rotary head is recording an information signal in a first area among the plurality of areas.

It is a further object of this invention to provide an information signal recording apparatus which is capable of forming recording tracks with their center lines aligned in a plurality of recording areas extending in the longitudinal direction of a tape-shaped recording medium.

Under that object, an information signal recording apparatus arranged as another embodiment of this invention to record an information signal in each of a plurality of recording areas extending in the longitudinal direction of a tape-shaped recording medium comprises: a rotary head arranged to be capable of recording the information signal while forming many recording tracks within each of the plurality of areas; and control means for performing control in such a manner that, when recording is performed on a first area among the plurality of areas, recording tracks being formed by the rotary head within the first area are aligned with recording tracks already formed within a second area among the plurality of areas.

These and further objects and features of this invention will become apparent from the following detailed description of a preferred embodiment thereof taken in conjunction with the accompanying drawings.

BRIEF DESCRIPTION OF THE DRAWINGS

FIGS. 3(a) to 3(j) show in a time chart the recording and reproducing operations of the same conventional tape recorder.

Part (a) of FIG. 4 shows the tracing locus of the rotary head of the conventional recorder obtained during reproduction.

Part (b) of FIG. 4 shows a reproduced RF signal according to the tracing locus shown in part (a) of FIG. 4.

Parts (a)–(j) of FIG. 7 is a timing chart showing the operation of the embodiment shown in FIG. 5.

DETAILED DESCRIPTION OF THE PREFERRED EMBODIMENT

Figure 5:
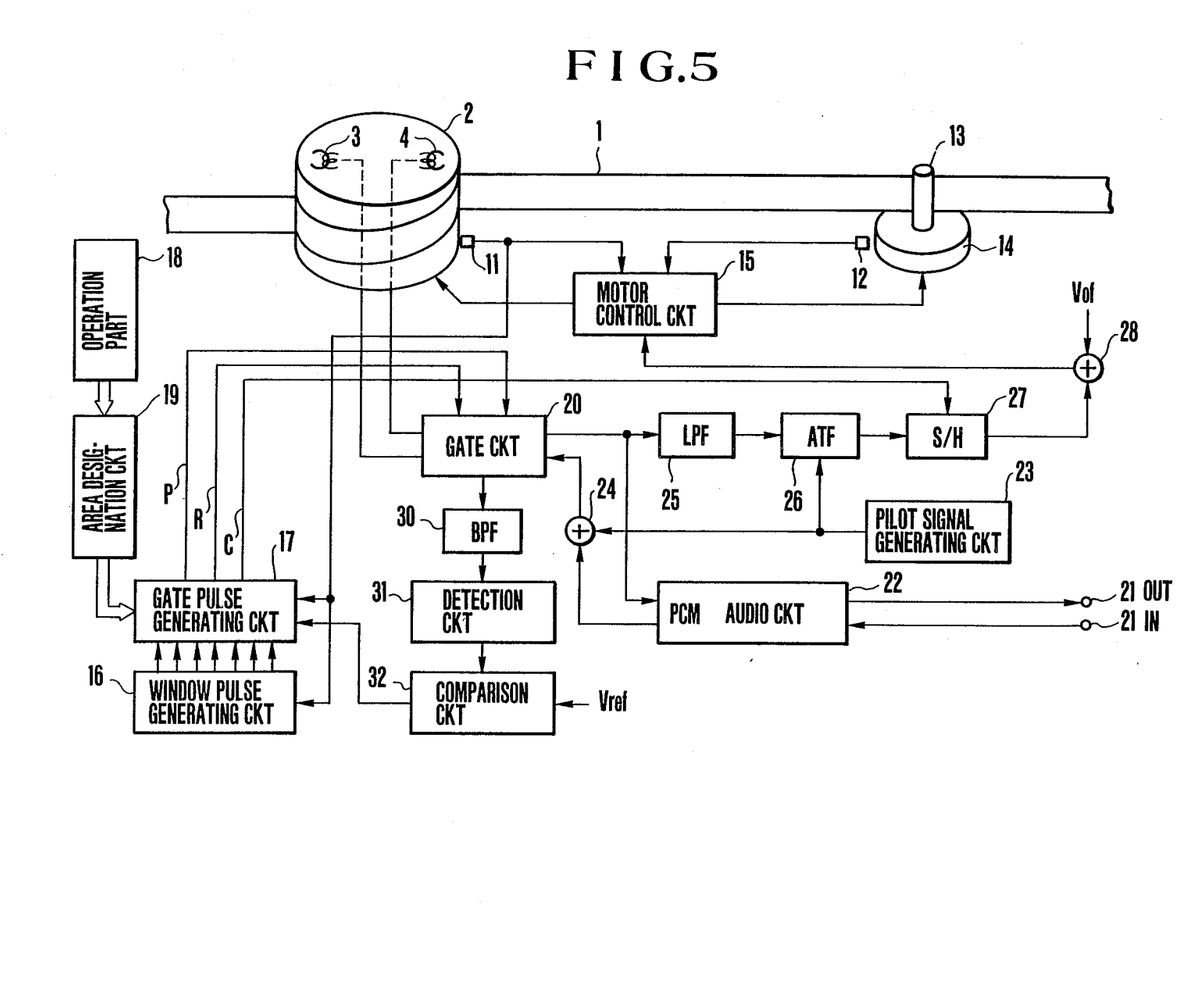
FIG. 5 is a diagram schematically showing in outline the arrangement of a tape recorder arranged as an embodiment of this invention.
Figure 7:
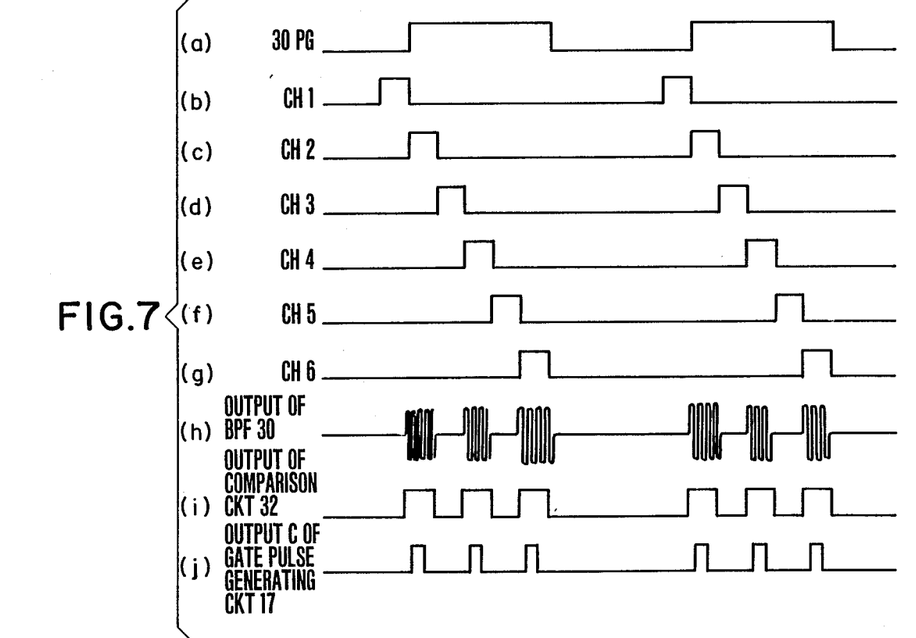

The following description shows in detail example where this invention is applied to a tape recorder:

FIG. 5 shows in outline the arrangement of this tape recorder. The recorder performs audio signal recording in the following manner: When one of recording areas is designated according to an instruction given at an operation part 18, an area designation circuit 19 supplies a gate pulse generating circuit 17 with data indicative of the area designated. Immediately after the issuance of an instruction for recording, the area designation circuit 19 first designates all the areas. A signal which is a logical sum of window pulses of six kinds (shown at parts CH1 to CH6 in parts (b)–(g) of FIG. 7 generated from a window pulse generating circuit 16 is supplied to a gate circuit 20 as a window pulse P for reproduction. Then, a reproduced signals are obtained from recorded areas by a head 3 which is mounted on a cylinder 2.

Assuming that, in recording a digital audio signal, a specific frequency signal is assumed to be superimposed on the recording signal and the frequency of the specific signal is assumed to be fA. Assuming that an instruction is issued to perform recording on the area CH1, the areas CH2, CH4 and CH6 are assumed to have signals already recorded therein. The gate circuit 20 produces all the reproduced signals obtained from all the areas immediately before commencement of recording. The signals which are thus produced from the gate circuit 20 are supplied to a band-pass filter (BPF) 30. The BPF 30 is arranged to separate a signal component having the above-stated, frequency fA. The output of the BPF 30 is as shown in part (h) of FIG. 7. The output is supplied via a detection circuit 31 to a comparison circuit 32. Then, the circuit 32 compares the output of the BPF 30 with a reference level signal Vref and produces a pulse signal as shown in part (i) of FIG. 7. The pulse signal thus obtained is supplied to a gate pulse generating circuit 17. After completion of this process, the gate pulse generating circuit 17 produces a logical sum signal of window pulses of the areas CH2, CH4 and CH6 as a reproducing gate pulse signal P. The circuit 17 further produces the window pulse of the designated area CH1 as a recording gate pulse signal R and another signal as a tracking control pulse signal C as shown in part (j) of FIG. 7.

In other words, in performing a recording operation on the area CH1, an analog audio signal coming from a terminal 21 is PCM (pulse code modulation) processed at a PCM audio circuit 22. The PCM processed audio signal is supplied to an adder 24 to have a tracking control pilot signals which are produced from a pilot signal generating circuit 23 and a signal having the frequency fA superimposed thereon. The output of the adder 24 is then gradually recorded in the area CH1 by means of heads 3 and 4. Meanwhile, signals reproduced from the magnetic tape by the heads 3 and 4 are gated at the gate circuit 20 according to the above-stated reproducing gate pulse signal P. Each of tracking control pilot signals which are included in the output of the gate circuit 20 is separated by a low-pass filter (LPF) 25. The pilot signal which is thus separated is supplied to an automatic tracking control circuit 26 (hereinafter referred to as ATF circuit). The ATF circuit 26 performs a signal processing operation in a known manner such as the four-frequency method or the like. The ATF circuit 26 produces a tracking error signal (hereinafter referred to as a signal ATF). A sample-and-hold circuit 27 (hereinafter referred to as S/H circuit) samples and holds the ATF signal at a timing at which the heads 3 and 4 trace the middle part of each recording area.

Figure 6:
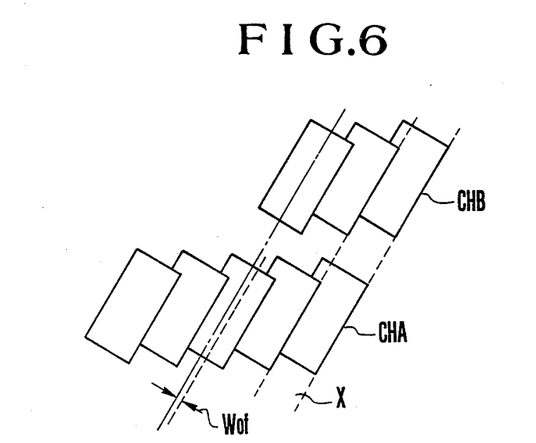
FIG. 6 shows a relation between recording tracks formed within a recorded area and within another area which is under a recording operation.

As mentioned above, a tracking error signal is obtained during recording. However, mere use of this tracking error signal for tracking control does not ensure that the recording tracks in all the recording areas are always perfectly aligned. In other words, in the case of azimuth overlapped writing, there arises a difference W of in the tracing locus of the head between recording and reproduction as shown in FIG. 6. In view of this, a level or value V of which corresponds to the difference W of is added at the adder 28 to the output of the S/H 27. The adder 28 thus produces a tracking control signal, which is supplied to a motor control circuit 15. Upon receipt of the tracking control signal, the circuit 15 causes a capstan 13 to control the travel of the tape.

Again referring to FIG. 5, an element 11 is arranged to detect the rotation of the cylinder 2 and to produce a rectangular wave signal of 30 Hz in synchronism with the rotation of the cylinder 2 (hereinafter referred to as signal 30 PG). This signal 30 PG is supplied to the above-stated window pulse generating circuit 16, the gate pulse generating circuit 17 and the motor control circuit 15. A rotation detecting circuit 12 is arranged to detect the rotation of the capstan 13. The capstan 13 is provided with a capstan wheel 14.

Figure 8:
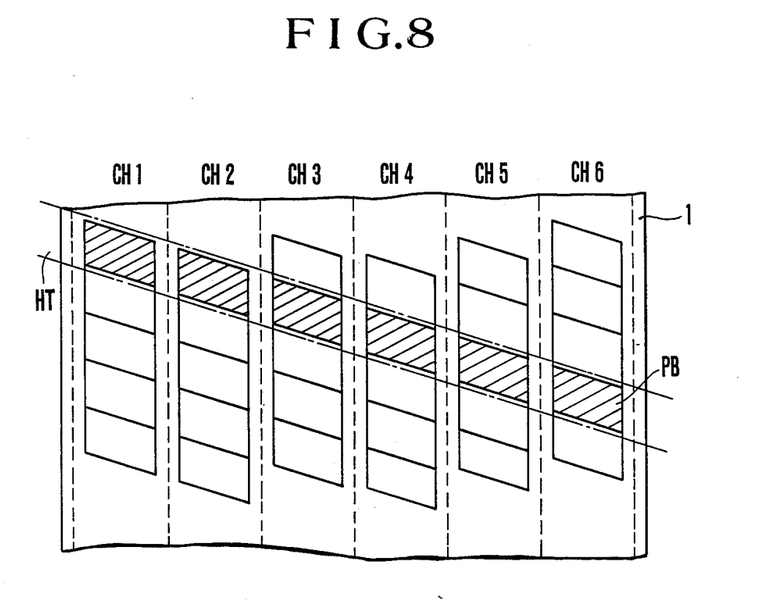
FIG. 8 is an illustration of a recording pattern obtained by the embodiment shown in FIG. 5.

The arrangement described enables the recorder to have the recording tracks of all the recording areas perfectly aligned on the same straight line. FIG. 8 shows a tape like recording pattern obtained by the above-stated tape recorder embodying this invention. As apparent from FIG. 8, with signals recorded on a tape by the tape recorder according to this invention, when the recorded tape is traced by a rotary head, the reproduced signal RF can be obtained at a sufficient level from any of the areas with tracking control performed by using the signal recorded in any of these areas.

In the embodiment described, the tracking control is arranged to be performed by using the tracking control pilot signals recorded in all the recorded areas. However, the same advantageous effect is also attainable by using tracking control pilot signal recorded in and obtained from one of the recorded areas.

Further, in case that recording is to be performed on one area while reproducing signals from another area, the operation can be adequately accomplished by using the tracking control pilot signals obtained from the area under reproduction.

A rotary head type recording apparatus embodying this invention as described in the foregoing is capable of utilizing with one and the same rotary head the tape-shaped recording medium.

What is claimed is:

1. An information signal recording apparatus for recording an information signal on each of a plurality of recording areas extending in a longitudinal direction of a tape-shaped recording medium, comprising:
    (a) a rotary head for forming many helical slant tracks and recording said information signal on a first area among said plurality of recording areas, the head width of said rotary head being wider than the width of said helical slant tracks;
    (b) moving means for longitudinally moving said tape-shaped recording medium;
    (c) forming means for forming tracking error signal indicative of the deviation of the position of said rotary head from helical slant tracks formed on a second area among said plurality of recording areas;
    (d) shifting means arranged to produce a tracking signal by shifting a level of the tracking error signal according to a difference between the head width of said rotary head and the width of said helical slant tracks formed in said second area; and
    (e) control means for controlling said moving means by using said tracking control signal produced by said shifting means while said rotary head is recording an information signal in said first area.

2. An apparatus according to claim 1, further comprising means for superimposing a plurality of pilot signals of different frequencies one after another on information signals to be recorded on said recording medium.

3. An apparatus according to claim 2, wherein said rotary head is able to reproduce signals from the recording medium, and wherein said forming means includes means for separating said pilot signals from signals reproduced by said rotary head.

4. An apparatus according to claim 1, further comprising manually operable means for designating one of said plurality of recording areas as said first area.

5. An apparatus according to claim 4, wherein said rotary head is able to reproduce signals from the recording medium, and further comprising selecting means for selecting one of said plurality of areas as said second area by using signals reproduced by said rotary head.

6. An apparatus according to claim 5, wherein said selecting means includes separating means for separating a signal of a predetermined frequency from said signals reproduced by said rotary head.

7. An information signal recording apparatus for recording an information signal in each of a plurality of recording areas extending in a longitudinal direction of a tape-shaped recording medium, comprising:
  (a) a rotary head for reproducing recorded signals and for recording said information signal while forming many helical slant tracks within each of said plurality of areas; and
  (b) control means for performing control in such a manner that, when recording is performed on one area among said plurality of areas, helical slant tracks being formed by said rotary head within the one area are aligned with helical slant tracks previously formed within another area among said plurality of areas in response to a tracking signal, said control means including error detection means for obtaining an error signal indicative of the deviation of the position of said rotary head by from helical slant tracks formed in the other area by using signals reproduced from the other area by said rotary head, and shifting means arranged to produce the tracking control signal by shifting a level of said error signal to an extent determined on the basis of a difference between the head width of said rotary head and the width of helical slant tracks formed in said second area.

8. An information signal recording apparatus for recording an information signal on each of a plurality of recording areas extending in longitudinal direction of a tape-shaped recording medium, comprising:
  (a) a rotary head for forming many helical slant tracks and recording said information signal on any of said plurality of recording areas, said rotary head being able to reproduce signals from any of said plurality of recording areas excepting an area on which said rotary head is recording said information signal;
  (b) manually operable means for designating one of said plurality of recording areas to be used for recording said information signal;
  (c) moving means for longitudinally moving said tape-shaped recording medium;
  (d) forming means for forming a tracking control signal by using signals reproduced by said rotary head from at least one of said plurality of recording areas excepting the area on which said rotary head is recording said information signal;
  (e) control means for controlling said moving means based on said tracking control signal while said rotary head is recording said information signal; and
  (f) selection means for selecting at least one of said plurality of recording areas to be used for forming said tracking control signal by using signals reproduced by said rotary head.

9. An apparatus according to claim 8, wherein said forming means includes error detection means for forming a tracking error signal indicative of the deviation of the position of said rotary head from helical slant tracks formed on said tape-shaped recording medium, and sampling means arranged to sample said tracking error signal for producing said tracking control signal.

10. An apparatus according to claim 9, wherein said selection means is arranged to control a timing at which said sampling means samples said tracking error signal.

11. An apparatus according to claim 8, further comprising means for superimposing a plurality of pilot signals of different frequencies one after another on information signals to be recorded on said recording medium.

12. An apparatus according to claim 11, wherein said forming means includes means for separating said pilot signals from signals reproduced by said rotary head.

13. An apparatus according to claim 8, wherein said selecting means includes separating means for separating a signal of a predetermined frequency from among said signals reproduced by said rotary head.

14. An information signal recording apparatus for recording an information signal on each of a plurality of recording areas extending in a longitudinal direction of a tape-shaped recording medium, comprising:
  (a) a rotary head for forming many helical slant tracks and recording said information signal on any of said plurality of recording areas, said rotary head being able to reproduce signals from the recording medium;
  (b) manually operable means for designating one of said plurality of recording areas to be used for recording said information signal;
  (c) moving means for longitudinally moving said tape-shaped recording medium;
  (d) error detection means for forming a tracking error signal indicative of the deviation of the position of said rotary head from helical slant tracks formed on said tape-shaped recording medium;
  (e) sampling means arranged to sample said tracking error signal for producing a tracking control signal;
  (f) timing control means for controlling a timing at which said sampling means samples said tracking error signal by using signals reproduced by said rotary head; and
  (g) tracking control means for controlling said moving means based on said tracking control signal while said rotary head is recording said information signal.

* * * * *